United States Patent
Takenami et al.

(10) Patent No.: US 6,475,940 B2
(45) Date of Patent: Nov. 5, 2002

(54) WEAR RESISTANT MEMBER FOR ELECTRONIC EQUIPMENT AND BEARING AND SPINDLE MOTOR THEREWITH

(75) Inventors: Yukihiro Takenami, Tokyo; Isao Ikeda, Yokohama; Minoru Takao, Yokohama; Hiroki Tonai, Yokohama; Yoshiyuki Fukuda, Kawasaki; Hisao Yabe, Hiratsuka; Michiyasu Komatsu, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/855,534

(22) Filed: May 16, 2001

(65) Prior Publication Data

US 2002/0013211 A1 Jan. 31, 2002

(30) Foreign Application Priority Data

May 16, 2000 (JP) ........................ 2000-142647
Apr. 26, 2001 (JP) ........................ 2001-130226

(51) Int. Cl.$^7$ .............................................. C04B 35/48
(52) U.S. Cl. ...................................... 501/103; 501/104
(58) Field of Search ................... 501/103, 104, 501/105

(56) References Cited

U.S. PATENT DOCUMENTS

| 4,748,138 A | 5/1988 | Watanabe et al. ............ 501/87 |
| 5,447,618 A | * 9/1995 | Sugiyama et al. .......... 204/426 |

FOREIGN PATENT DOCUMENTS

| JP | 1-24747 | 5/1989 |
| JP | 3-51667 | 8/1991 |
| JP | 08031614 | * 2/1996 |
| JP | 8-296649 | 11/1996 |
| JP | 11-223220 | 8/1999 |
| JP | 2000-314426 | 11/2000 |

* cited by examiner

Primary Examiner—Paul Marcantoni
(74) Attorney, Agent, or Firm—Foley & Lardner

(57) ABSTRACT

Wear resistant member for electronic equipment comprises a zirconium oxide sintered body of which specific resistance is in the range from 1 to $10^5$ Ω·m. A conductivity enhancer of which specific resistance is $10^{-5}$ Ω·m or less is compounded to a zirconium oxide sintered body to materialize specific resistance from 1 to $10^5$ Ω·m. For a conductivity enhancer, carbides and nitrides of various kinds of metals can be used. Wear resistant member can be used as a bearing ball, being applied in a rotational driver of electronic equipment such as a magnetic recording device and an optical disk device. Deficiency due to static electricity of electronic equipment is cancelled due to specific resistance that a zirconium oxide sintered body has.

12 Claims, 3 Drawing Sheets

WEAR RESISTANT MEMBER FOR ELECTRONIC EQUIPMENT AND BEARING AND SPINDLE MOTOR THEREWITH

BACKGROUND OF THE INVENTION

1. Field of the Invention

The present invention relates to a wear resistant member for electronic equipment in which deficiency due to static electricity is lessened, and a bearing and spindle motor therewith.

2. Description of the Related Art

In recent years, magnetic recording devices such as hard disk drives (HDDS) and floppy disk drives (FDDs), optical disk devices such as CD-ROMs and DVDs, and various kinds of game machines have made a remarkable development. In electronic equipment, usually a rotational driver such as spindle motor rotates a rotation axis with high speed, thereby facilitating various kinds of disks mounted to this rotation axis to function.

So far, for bearing member supporting such rotation axis, in particular, for bearing balls, metal such as bearing steel or the like has been used. However, metal such as bearing steel or the like is poor in wear resistance. Accordingly, in the field requiring a high speed rotation of more than 5000 rpm such as for instance electronic equipment, due to an increase of fluctuation of life, there are problems that reliable rotational drive cannot be provided.

In order to overcome such deficiencies, recently for the bearing balls, ceramics such as silicon nitride sintered body has been employed (cf. Japanese Patent Laid-Open Application No. JP-A 2000-314426). Among the ceramics, the silicon nitride sintered body is excellent in sliding properties and has excellent wear resistance. Accordingly, even when rotating at high speeds, mechanically reliable rotational drive can be provided.

However, a silicon nitride bearing ball is electrically an insulator. Accordingly, there occur a problem that static electricity generated when rotating at high speeds can be skillfully guided neither to the rotation axis consisting of metallic material such as bearing steel or the like nor to bearing member other than the bearing ball such as ball receiver. Thus, when without successfully dissipating to build up unnecessarily the static electricity in the bearing and periphery components, in a recording device using magnetic signals such as for instance HDD, an adverse affect may be caused on a recording medium. As a result, there are concerns that the content recorded in the HDD may be lost, and furthermore the electronic equipment itself may be destroyed.

Furthermore, portable personal computers, electronic notebooks, various kinds of mobile products and so on have been downsized year by year, accordingly for the HDDs therefor, demands for larger storage capacity and smaller size have become stronger year by year. In order to come up to such demands, for instance in the HDDs, rotation of still higher speed has been studied, and in the future, the high speed rotation of approximately 10000 rpm or more is expected to be realized. It is the bearing configured of the rotation axis, a bearing ball and a ball receiver that supports such high speed rotation, excess pressure being essentially concentrated on the bearing balls.

In addition to this, when rotating at high speeds, due to sliding of the bearing ball, a large amount of heat is liberated. At that time, silicon nitride is largely different in linear expansion coefficient from that of bearing steel (for instance SUSJ2) that constitutes the rotation axis and ball receiver. Accordingly, there occur such problems that due to the deformation caused by thermal expansion of the metal member, noise or unusual sound is generated, or due to thermal strain caused by thermal expansion, non-synchronized deflection is generated. Also from such viewpoints, the existing silicon nitride bearing ball cannot sufficiently come up to the longer time high speed rotation.

To the problems caused due to the high speed rotation as mentioned above, a bearing that employs a bearing ball consisting of a zirconium oxide sintered body of which linear expansion coefficient is close to that of metal is proposed (Japanese Patent Laid-Open Application No. JP-A 11-223220). The zirconium oxide sintered body, while, in addition to the above, being superior to the silicon nitride sintered body in fracture toughness, is an electrical insulator similarly with the silicon nitride bearing ball. Accordingly, when rotating at high speeds, there is similarly accumulated static electricity. It cannot be overcome that based on the static electricity, there occur various problems.

A conductive zirconium oxide sintered body of which specific resistance is approximately $10^{-5}$ $\Omega \cdot m$ is known (cf. Japanese Patent Publication Gazette Nos. JP-B2 1-24747 and JP-B2 3-51667). To such conductive zirconium oxide sintered body that is mainly used in cutting tools and electrical resistance heating elements, a large amount of conductivity enhancer such as carbides or the like is added to improve conductivity (low specific resistance). In the zirconium oxide sintered body wherein a large amount of the conductivity enhancer is added, while the specific resistance itself becomes lower, the conductivity enhancer that are excessively added tend to coagulate themselves. This causes to lower mechanical strength and sliding properties of the zirconium oxide sintered body.

For instance, as in the case of bearing balls, in the use always exposed to repetition fatigue of compressive stress and/or tensile stress, when the aforementioned agglomerated particle exists in a large amount, cracks tend to start therefrom. As a result, the sliding properties are largely deteriorated. Accordingly, the conductive zirconium oxide sintered body such as mentioned in the above publications is far from applying in the wear resistant member such as bearing balls. The above publications, not assuming the application of the conductive zirconium oxide sintered body in the sliding member, give the conductivity only to make use electric discharge machining.

In Japanese Patent Laid-Open Application No. JP-A 8-296649, it is disclosed that ceramic material having volume resistivity of $10^4$ $\Omega \cdot m$ or less is used in a dynamic pressure bearing having a spiral groove that generates a dynamic pressure effect. However, there are used ceramic materials such as sintered bodies essentially consisting of conductive ceramics such as SiC, TiC, TiN, and $TiB_2$, and composite sintered bodies between $Al_2O_3$ and TiC, and $ZrO_2$ and NiO. There is not disclosed any of ceramic material that has characteristics intrinsic to the zirconium oxide sintered body.

SUMMARY OF THE INVENTION

Accordingly, an object of the present invention is to provide a wear resistant member for electronic equipment that can realize a stable high speed rotation when applied in the bearing ball or the like, in addition can prevent unnecessarily excessive static electricity from accumulating. Furthermore, another object is to provide a bearing and spindle motor that, by the use of such wear resistant member for electronic equipment, enable to realize higher performance and higher reliability of the electronic equipment such as magnetic recording device such as HDDs and optical disk device such as DVDs.

The wear resistant member for electronic equipment of the present invention comprises a zirconium oxide sintered body of which specific resistance is in the range from 1 to $10^5$ Ω·m. In the wear resistant member for electronic equipment of the present invention, the zirconium oxide sintered body comprises a conductivity enhancer of which specific resistance is $10^{-5}$ Ω·m or less.

In the wear resistant member for electronic equipment of the present invention, the conductivity enhancer contained in the zirconium oxide sintered body is preferable to be at least one kind selected from carbides and nitrides of elements of 4A, 5A, 6A and 7A groups in the periodic table, silicon and boron. In particular, at least one kind of carbide selected from tantalum (Ta), niobium (Nb), chromium (Cr), tungsten (W), molybdenum (Mo), titanium (Ti), zirconium (Zr), hafnium (Hf), manganese (Mn) and silicon (Si) carbides is preferably used.

Furthermore, in the wear resistant member for electronic equipment of the present invention, similarly with general purpose zirconium oxide sintered body, the zirconium oxide sintered body containing a rare earth compound and/or alkaline earth compound as a stabilizer can be used. In particular, it is preferable to use the zirconium oxide sintered body containing from 2 to 5 mole percent of rare earth compound together with from 0.5 to 3 mole percent of alkaline earth compound. In that case, the rare earth compound functions as the stabilizer for the zirconium oxide and the alkaline earth compound functions as sintered additive. Accordingly, the zirconium oxide sintered body of higher density can be obtained.

The wear resistant member for electronic equipment of the present invention is preferably employed in particular in electronic equipment such as magnetic recording devices such as HDDs and FDDs and optical disk devices such as CD-ROMs and DVDs. As a specific shape of the wear resistant member of the present invention, a rolling element used for a rotational driver of the electronic equipment as mentioned above can be cited. In particular, the wear resistant member of the present invention is suitable for the bearing balls for electronic equipment.

In the wear resistant member for electronic equipment of the present invention, the conductivity enhancer is preferable to have a particulate shape of a average particle diameter of 2 μm or less, and furthermore a maximum diameter of the agglomerated portion of the conductivity enhancer being preferable to be 10 μm or less. The conductivity enhancer is preferable to exist in the range from 3 to 20 pieces in an arbitrary straight distance of 50 μm in the zirconium oxide sintered body. Furthermore, the conductivity enhancer is preferable to be only on a surface layer portion of the zirconium oxide sintered body.

In the wear resistant member for electronic equipment of the present invention, the zirconium oxide sintered body that is particularly high, among the ceramic materials, in fracture toughness and is close in the thermal expansion coefficient to metallic materials is applied. In addition to the above, to the zirconium oxide sintered body that is intrinsically an electrical insulator, the specific resistance in the range from 1 to $10^5$ Ω·m is given to use. Thus, in the present invention, without damaging mechanical properties such as fracture toughness and wear resistance intrinsic to the zirconium oxide sintered body, appropriate conductivity is given. Accordingly, by applying the zirconium oxide sintered body having such properties to the bearing balls or the like, in addition to a stable high speed rotation, the static electricity affecting various adverse influences on the electronic equipment can be skillfully set free.

A bearing of the present invention comprises a bearing ball consisting of the above mentioned wear resistant member for electronic equipment of the present invention. A spindle motor of the present invention comprises the bearing of the present invention. As a specific form of the spindle motor of the present invention, a structure comprising a stator axis, a rotor, and a stator can be cited. To the stator axis, the bearing is mounted. The rotor is supported rotatable through the bearing to the stator axis and has a rotor magnet. The stator has a stator coil disposed opposite to the rotor magnet a prescribed gap apart.

DESCRIPTION OF THE PREFERRED EMBODIMENTS

Figure 1:
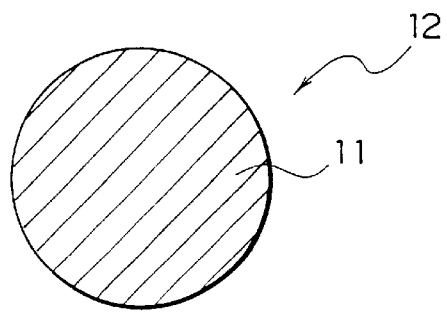
FIG. 1 is a sectional view showing a configuration of a bearing ball according to a first embodiment of a wear resistant member for electronic equipment of the present invention.

In the following, modes for implementing the present invention will be explained.

A wear resistant member for electronic equipment of the present invention comprises a zirconium oxide sintered body of which specific resistance is in the range from 1 to $10^5$ Ω·m. Here, the zirconium oxide sintered body indicates a sintered body essentially consisting of zirconium oxide. The zirconium oxide itself, being oxide, is intrinsically high in insulating properties, being in general $10^8$ Ω·m or more in specific resistance. Accordingly, when used as it is in the electronic equipment such as HDDs, static electricity cannot be removed.

Accordingly, in the present invention, to the zirconium oxide sintered body, a specific resistance value in the range from 1 to $10^5$ Ω·m is given. Due to the specific resistance of $10^5$ Ω·m ($10^7$ Ω·cm) or less of the zirconium oxide sintered body, when used in the electronic equipment such as for instance HDDs, the static electricity generated due to high speed rotation can be excellently released to a bearing member consisting of metallic material such as a stator axis. Accordingly, deficiency accompanying static electricity accumulation can be cancelled. When the specific resistance of the zirconium oxide sintered body exceeds $10^5$ Ω·m, the static electricity cannot be assuredly released.

On the other hand, when the specific resistance of the zirconium oxide sintered body is less than 1 Ω·m ($10^2$ Ω·cm), for the dissipation of the static electricity, an effect more than that cannot be obtained. Furthermore, in order to obtain such low specific resistance, a large amount of conductivity enhancer has to be added. When a large amount of the conductivity enhancer is compounded in the zirconium oxide sintered body, the conductivity enhancer itself tends to agglomerate, thereby damaging mechanical properties such as fracture toughness and wear resistance of the zirconium oxide sintered body.

In other words, according to the zirconium oxide sintered body of which specific resistance is set in the range from 1 to $10^5$ Ω·m, without damaging merits that fracture toughness and wear resistance are excellent and the linear thermal expansion coefficient is close to the metal, the deficiency due to the static electricity can be cancelled. The specific resistance of the zirconium oxide sintered body is furthermore preferable to be in the range from 10 to $10^4$ Ω·m.

The wear resistant member for electronic equipment of the present invention is used, specifically, in a rotational driver of various kinds of electronic equipment, as a rolling element of a bearing. The wear resistant member of the present invention is particularly suitable for the bearing balls for the electronic equipment. It is particularly effective for a smaller bearing ball of which diameter is 3 mm or less. In general, the shape of the bearing ball is spherical. The shape of the rolling element to which the present invention is applied is not necessarily restricted to a ball but can be cylindrical or bar like. The present invention can be applied to various kinds of bearings such as ball bearing, roller bearing, dynamic pressure bearing or the like.

Furthermore, the present wear resistant member for electronic equipment can be applied in various kinds of electronic equipment having a rotational driver. As such electronic equipment, magnetic recording devices such as HDDs and FDDs, optical disk devices such as CD-ROMs and DVDs, and various kinds of game machines can be cited. The optical disk device includes various kinds of optical recording devices such as magneto optical recording devices, phase transition type optical recording devices, playback-only optical disk devices or the like. Furthermore, other than the above, to various kinds of the electronic equipment that has a rotational driver, the present invention can be applied.

According to the bearing ball consisting of the zirconium oxide sintered body of which specific resistance is in the range from 1 to $10^5$ Ω·m, in addition to the above cancellation of the deficiency due to the static electricity, the following advantages can be obtained. That is, the zirconium oxide is very close in the linear expansion coefficient to the metallic material such as bearing steel or the like. Bearing member (ball receiver or the like) other than the bearing ball is constituted of metallic material such as for instance bearing steel. When a motor is rotated with a high speed, due to the sliding, the bearing member is heated. However, by approximating the linear expansion coefficients of the bearing ball and ball receiver, non-synchronized deflection due to the thermal strain can be prevented from occurring. Thereby, reliable high speed rotation can be realized.

In other words, the bearing ball consisting of the wear resistant member of present invention is particularly effective in the bearing in which bearing member other than the ball is made of metal. In the bearing of the present invention, the bearing member other than the ball may be constituted of material other than metal such as ceramic material.

Figure 6:
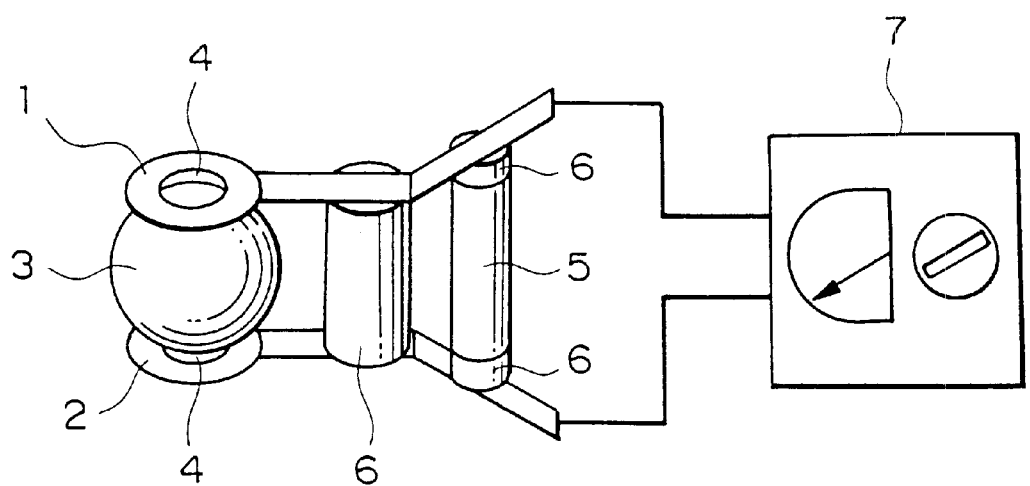
FIG. 6 is a diagram showing an example of measurement of specific resistance when applying a wear resistant member for electronic equipment to a bearing ball.

In the present invention, specific resistance of the zirconium oxide sintered body indicates primarily volume resistivity. An example of measurements of the specific resistance when the wear resistant member of the present invention is applied to the bearing ball is shown in the following with reference to FIG. 6. For electrodes l and 2 for measuring specific resistance, one having an opening 4 in the center in accordance with a diameter of the bearing ball is used. Such measuring electrodes 1 and 2 sandwich the bearing ball 3 from above and below. Force sandwiching the bearing ball 3 is adjusted by means of a spring 5 or the like. In the drawing, reference numerals 6 and 7 denote an insulator and tester, respectively. The volume resistivity thus measured is taken as the specific resistance of the wear resistant member (bearing ball 3) of the present invention.

In the wear resistant member for electronic equipment of the present invention, in order to obtain the zirconium oxide sintered body of a prescribed specific resistance, for instance, on the surface thereof a conductive layer may be formed. In the member always sliding such as the bearing ball, however, there tends to occur problems of layer peeling or the like. To the problems, in the present invention, it is preferable for the zirconium oxide sintered body to contain conductive material as conductivity enhancer. The conductivity enhancer is preferable to have the specific resistance of $10^{-5}$ Ω·m ($10^{-3}$ Ω·cm) or less. When the specific resistance of the conductivity enhancer exceeds $10^{-5}$ Ω·m, an amount that has to be compounded in the zirconium oxide sintered body to give a prescribed specific resistance increases. As a result, the mechanical strength or the like of the zirconium oxide sintered body is liable to deteriorate.

For the conductivity enhancer like this, various materials such as carbides, nitrides and metals capable of controlling the specific resistance of the zirconium oxide sintered body can be used. Among them, at least one kind selected from carbides and nitrides of 4A, 5A, 6A and 7A group elements of the periodic table, silicon and boron can be preferably used. The periodic table of the present invention is according to Japanese style, denotation of 4A, 5A, 6A and 7A groups corresponds to 4B, 5B, 6B and 7B groups of US style, respectively. The carbides and nitrides are chemically stable and excellent in heat resistance. Accordingly, these compounds are less susceptible to an adverse influence due to heat generated when the bearing ball or the like slides. The presence of these conductivity enhancers can be analyzed by means of EPMA and X-ray diffraction.

As the conductivity enhancer, it is preferable to use at least one kind of carbide selected from carbides of tantalum (Ta), niobium (Nb), chromium (Cr), tungsten (W), molybdenum (Mo), titanium (Ti), zirconium (Zr), hafnium (Hf), manganese (Mn) and silicon (Si). The wear resistant member of the present invention is used as the bearing ball or the like. As a result, the conductivity enhancer is also slid together with the zirconium oxide sintered body. Accordingly, also for the conductivity enhancer, the sliding properties are demanded to a certain extent, therefrom the aforementioned metal carbides being preferably used.

The conductivity enhancer consisting of the aforementioned carbides and nitrides is preferable to have a particle shape of an average particle diameter of 2 μm or less. By the use of such carbide or nitride powder, the conductivity enhancer can be excellently dispersed in the zirconium oxide sintered body. On the other hand, when whisker or fibrous material is used as the conductivity enhancer, these are liable to be present as thorn-like projections on the surface of the bearing ball or the like. The thorn-like projection on the surface, during the sliding, tends to increase aggression against a counterpart such as the ball receiver, resulting in a starting point of fracture.

An amount of the conductivity enhancer being compounded, according to the specific resistance of the conductivity enhancer being used, is appropriately adjusted for the specific resistance of the zirconium oxide sintered body to be in the range from 1 to $10^5$ Ω·m. For instance, when the carbide or nitride is used as the conductivity enhancer, it is preferable to be added 35 volume percent or less with respect to a total amount of the sintered body. The amount of the conductivity enhancer being compounded is furthermore preferable to be in the range from 5 to 25 percent by volume.

In the present invention, when considering only to control the specific resistance of the zirconium oxide sintered body to a prescribed value, the conductivity enhancer of 35 volume percent or more can be added without causing particular problems. However, when added too much, the advantages that the wear resistance and fracture toughness of the intrinsic zirconium oxide sintered body are excellent and the linear expansion coefficient thereof is close to that of metal are liable to be exhibited with difficulty. When the content of the conductivity enhancer is less than 5 volume percent, the specific resistance can be controlled to a prescribed value with difficulty. Accordingly, it is not so preferable.

The content (volume percent) of the conductivity enhancer of the present invention can be obtained by a method in which the content thereof is specified from an area ratio of the conductivity enhancer present for instance in a unit area (100×100 μm). At that time, the area ratio of the conductivity enhancer a unit area is measured at arbitrary three points or more, preferably at four points of two each on surface and section, by averaging these obtaining an average value.

In the wear resistant member of the present invention, the conductivity enhancer is preferable to be finely dispersed in the zirconium oxide sintered body. Specifically, the conductivity enhancer is preferable to be dispersed so that the maximum diameter of the agglomerated portion of the conductivity enhancer is 10 μm or less. Part of the conductivity enhancer is present on a surface layer portion of the bearing ball or the like, thereby the conductivity enhancer naturally shouldering part of the sliding surface. Accordingly, when an agglomerate diameter of the conductivity enhancer is too large, fracture or the like tends to start therefrom, resulting in inability of making the best use of excellent wear resistance intrinsic to the zirconium oxide sintered body. Accordingly, the maximum diameter of the agglomerated portion of the conductivity enhancer is preferable to be 10 μm or less, more preferable to be 5 μm or less, still more preferable to be 3 μm or less.

However, when the maximum diameter of the conductivity enhancer is too small, homogeneous dispersion is difficult that tends to result in the agglomeration between the conductivity enhancer itself on the contrary. As a result, during the sliding, the agglomerated particles tend to be detached. Accordingly, the maximum diameter is preferable to be 0.2 μm or more. The maximum diameter of the conductivity enhancer is desirable to be in the range from 0.5 to 3 μm. In the present invention, the maximum diameter of the conductivity enhancer (including the maximum diameter of the agglomerated portion) indicates the longest diagonal of the conductivity enhancer, being simply measured by the longest diagonal shown when an enlarged photograph is taken.

Furthermore, in the wear resistant member for electronic equipment of the present invention, a dispersion state of the conductivity enhancer is preferable for the number of the conductivity enhancer to be from 3 to 20 pieces in an arbitrary straight distance of 50 μm in the zirconium oxide sintered body, more preferable to be from 5 to 10 pieces. The number of the conductivity enhancer is measured in the following manner. First, an enlarged photograph of an arbitrary surface or section is taken, on the enlarged photograph a straight line (0.3 mm wide) corresponding to 50 μm is arbitrarily drawn, the number of the conductivity enhancer on the line being counted.

In the above measurement of the number of the conductivity enhancer, the enlarged photograph is desirable to be taken by enlargement of 2000 times (5 μm is shown in 100 mm) or more. In the case of the surface or section of the zirconium oxide sintered body being observed under such or more enlargement, when a straight line of a length corresponding to a straight distance 50 μm is drawn, a line width of 0.3 mm, in counting the number of the conductivity enhancer, causes smaller fluctuation in judging whether the conductivity enhancer touches the straight line or not. When counting the number of the conductivity enhancer in the zirconium oxide sintered body, a unit distance of 50 μm can give smaller fluctuation in counting the number of the conductivity enhancer in the zirconium oxide sintered body.

As to the positions for measuring the number of the conductivity enhancer in the straight distance of 50 μm in the zirconium oxide sintered body, when applying homogeneous mixing described below, the conductivity enhancer is homogeneously mixed, there being no problem in simply measuring only one point on the surface. However, usually, two points each on the surface and section, a total of four points, are measured to average. In measuring, at measuring points each, an enlarged photograph corresponding to a unit area of 100×100 μm is taken, based on the aforementioned method the number of the conductivity enhancer being measured. Though the enlarged photograph is not particularly restricted, electron micrograph, XDS, EPMA and the like are generally used. When color mapping is implemented, the conductivity enhancer can be discerned with ease.

When judging based on the enlarged photograph, since a spherical body like the bearing ball is pictured curved in an edge portion of the photograph, it is considered that the accurate number of the conductivity enhancer on the surface is not shown. However, in a small range such as a unit area of 100×100 μm, without considering the above point, there is essentially no problem. Furthermore, since the conductivity enhancer is counted if being on the straight line, a center portion thereof is not necessarily on the line. All the conductivity enhancer of which edge touches the straight line is contained in the number of the conductivity enhancer in the straight distance of 50 μm.

When the number of the conductivity enhancer in an arbitrary straight line of 50 μm in the zirconium oxide sintered body is less than three, the followings are considered. That is, (1) the content of the conductivity enhancer is scarce, and (2) the maximum diameter of one piece of conductivity enhancer is extremely large. When the content is scarce as in (1), the specific resistance of the zirconium oxide sintered body does not decrease so much, resulting in an insufficient effect due to the addition of the conductivity enhancer. Furthermore, in the case of (2) (when including the conductivity enhancer of for instance 20 μm), an amount of the conductivity enhancer in the zirconium oxide sintered body is essentially too much, resulting in deteriorating the characteristics intrinsic to the zirconium oxide sintered body.

On the other hand, the number of the conductivity enhancer in an arbitrary straight distance of 50 μm in the zirconium oxide sintered body exceeds 20, the followings are considered. That is, (3) a large number of extremely fine particles are present, and (4) almost all component constituting the sintered body is the conductivity enhancer. In the case of (3), for instance, when machining the bearing ball, or when using after machining as the bearing ball, the conductivity enhancer tends to agglomerate to result in detachment of the agglomerated particles. When the detachment occurs, a pore is generated there, and furthermore cracks tend to occur therefrom. Resultant cracks or chips cause a shorter life of the bearing ball. In the case of (4), a state essentially identical with that of case (2) is obtained. As a result, the characteristics intrinsic to the zirconium oxide sintered body cannot be made use of.

When counting the number of the conductivity enhancer in a straight distance of 50 μm, individual particles are counted one by one. Accordingly, one in which a large number of particles agglomerates as in the case of the agglomerated particle is not counted as one particle on the line, but is counted as the number of the respective particles constituting the agglomerated particle. For instance, when in the straight distance of 50 μm there are one agglomerated particle of the maximum diameter of 7 μm and one non-agglomerated particle of the conductivity enhancer, the number of the conductivity enhancer is not two. Alternatively, the number of individual particles in the agglomerated particle present on the straight distance of 50 μm is counted. That is, when the agglomerated particle of the maximum diameter of 7 μm consists of three particles conductivity enhancer (not to mention, all three are on the straight distance of 50 μm), together with one particle of non-agglomerated conductivity enhancer mentioned above, the number of the conductivity enhancer present on the straight distance of 50 μm is counted as four in total.

The wear resistant member for electronic equipment of the present invention has preferably a form in which part of the conductivity enhancer is present on a surface of the bearing ball or the like. The form present on the surface means that the conductivity enhancer is present on a sliding surface of the bearing ball. That is a state where the conductivity enhancer is exposed on the surface of the bearing ball. Thus, by making the part of the conductivity enhancer exist on the surface of the bearing ball, the aforementioned deficiency due to the static electricity can be effectively cancelled. When the conductivity enhancer is made to exist on the surface of the bearing ball, the static electricity generated due to the high speed rotation of the bearing can be effectively released through the conductivity enhancer on the surface to the ball receiver or the like. Accordingly, the static electricity built up to an extent that affects adversely on the electronic equipment such as for instance HDDS can be more assuredly prevented from building up.

The conductivity enhancer may be dispersed in an entire zirconium oxide sintered body. However, by dispersing only in the surface layer portion of the zirconium oxide sintered body, effects of canceling the deficiency due to the static electricity and of maintaining the characteristics of the zirconium oxide sintered body can be more excellently obtained. FIG. 1 shows a configuration of a bearing ball 12 consisting of a zirconium oxide sintered body 11 in which the conductivity enhancer is entirely dispersed. On the other hand, FIG. 2 shows a configuration of the bearing ball 12 that comprises an internal layer portion 13 consisting of a sintered body of zirconium oxide alone and a surface layer portion consisting of a zirconium oxide sintered body 14 in which the conductivity enhancer is dispersed.

Figure 2:
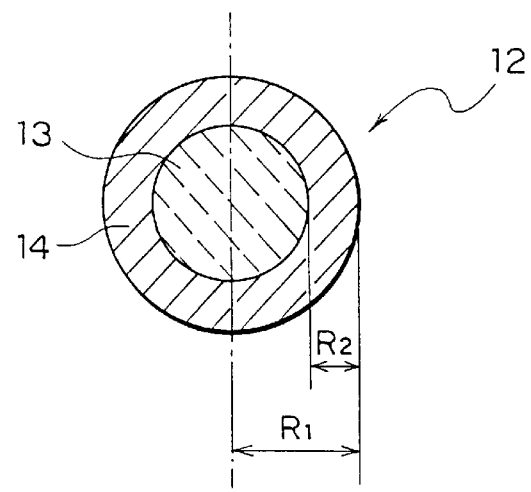
FIG. 2 is a sectional view showing a configuration of a bearing ball according to a second embodiment of a wear resistant member for electronic equipment of the present invention.

The bearing ball 12 shown in FIG. 2 has the surface layer portion 14 of which specific resistance is lower than that of the internal layer portion 13. The amount being compounded and the dispersion state of the conductivity enhancer in the surface layer portion 14 are as mentioned above. A thickness $R_2$ of such surface layer portion 14 is preferable to be in the range of up to one third with respect to a radius $R_1$ of the bearing ball 12 from the surface thereof. That is, it is preferable to be $\frac{1}{3}R_1 \geq R_2$. This is because when the surface layer portion 14 that contains the conductivity enhancer exceeds one third of the radius $R_1$, an effect structuring into two layers of the surface layer portion 14 and the internal layer portion 13 decreases.

For a prevention effect of static electricity from building up, appropriate conductivity need only be given only on the surface of the bearing ball 12. In that case, due to the confinement of the conductivity enhancer to the surface layer portion 14, an amount of the conductivity enhancer can be reduced. Furthermore, since the internal layer portion 13 does not contain the conductivity enhancer, the mechanical properties such as fracture toughness intrinsic to the zirconium oxide sintered body can be more effectively obtained. Accordingly, the sliding properties or the like of the bearing ball 12 can be further enhanced. Similarly, the characteristics that the linear expansion coefficient of the zirconium oxide sintered body is close to metal, for instance bearing steel, can be made use of with ease. In the case of a cylindrical rolling element or the like, with a shortest radius as a base line, the range of one third from the surface is derived.

The thickness $R_2$ of the surface layer portion 14 is further preferable to be 10 μm or more. When the thickness of the surface layer portion 14 is less than 10 μm. the conductivity enhancer in the surface layer portion 14 is fixed with difficulty, when sliding as the bearing ball 12 the particle of the conductivity enhancer being likely to be detached therefrom. When being detached, fracture starts therefrom to result in deteriorating the life of the bearing ball 12. Accordingly, the preferable range of the thickness $R_2$ of the surface layer portion 14 containing the conductivity enhancer is 10 μm or more and one third or less the radius $R_1$.

Figure 3:
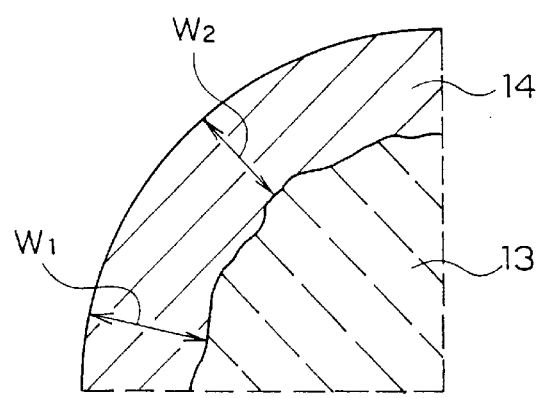
FIG. 3 is a sectional view showing schematically an example of maximum and minimum thicknesses of a surface layer portion in the bearing ball shown in FIG. 2.

Furthermore, as shown in FIG. 3, the difference between maximum and minimum thicknesses $W_1$ and $W_2$ of the surface layer portion 14 is preferable to be 5 μm or less. In the case of the bearing ball 12 having essentially a two layer structure of the surface layer portion 14 and the internal layer portion 13, when there is fluctuation in the thickness of the surface layer portion 14, fluctuation in the rolling life tends to be caused. For instance, when effecting to slide as the bearing ball 12, strain tends to be generated at a position where the thickness of the surface layer portion 14 is thin, therefrom peeling being likely to be caused. Accordingly, it is preferable to reduce the fluctuation of the thickness of the surface layer portion 14. The surface layer portion 14 excellent in thickness uniformity, by the use of rolling granulation below described, can be obtained with reproducibility.

In the wear resistant member for electronic equipment of the present invention, except for compounding the conductivity enhancer, similarly with the general use zirconium oxide sintered body, the zirconium oxide sintered body containing as the stabilizer a rare earth compound and alkaline earth compound in the range of 15 mole percent or less can be used. For the rare earth compound as the stabilizer, yttrium oxide ($Y_2O_3$) and cerium oxide ($CeO_2$) can be cited. Similarly, as the alkaline earth compound, magnesia (MgO), calcia (CaO) or the like can be cited. In the case of $Y_2O_3$ being used as the stabilizer, it is preferably compounded in the range from 2 to 5 mole percent. MgO or CaO, when using, is preferably compounded in the range from 0.5 to 10 mole percent. The amounts of the rare earth compound and alkaline earth compound being compounded are determined based on a stabilized structure (crystal structure) of zirconium oxide.

In the present invention, the zirconium oxide sintered body containing from 2 to 5 mole percent of rare earth compound ($Y_2O_3$ and so on) and from 0.5 to 3 mole percent of alkaline earth compound (MgO and so on) is preferably used. In that case, the rare earth compound functions as the stabilizer for the zirconium oxide sintered body and the alkaline earth compound functions as a sintered additive therefor. As a result, the zirconium oxide sintered body of higher density can be obtained with ease.

That is, while ordinary zirconium oxide sintered body is densified due to solid phase sintering, the concurrent use of the rare earth compound and alkaline earth compound enables to sinter due to liquid phase sintering, resulting in obtaining denser sintered body with ease. In particular, the metal carbide, when compounded as the conductivity enhancer, can be a factor disturbing the sintering. However, by making use of the liquid phase sintering, the zirconium oxide sintered body of higher density can be obtained with good reproducibility. When the rare earth compound and alkaline earth compound are concurrently used, an amount of the rare earth compound being compounded is determined based on the stabilized structure (crystal structure) of the zirconium oxide sintered body. The amount of the alkaline earth compound being compounded, in view of obtaining a sufficient effect of liquid phase sintering, is preferable to be 0.5 mole percent or more. However, when the alkaline earth compound is compounded more than 3 mole percent, after the sintering, the mechanical strength or the like tends to deteriorate with ease.

Although a method for manufacturing a wear resistant member for electronic equipment of the present invention is not particularly restricted, it is preferably manufactured for instance by means of the following methods.

First, prescribed amounts of zirconium oxide powder, stabilizer powder (including sintered additive), and conductivity enhancer powder are measured respectively and these are mixed thoroughly. Then, the mixed powder is granulated and molded into a desired shape (ball like shape, for instance). Thereafter, the molded body is sintered to obtain a wear resistant member for electronic equipment of the present invention. When manufacturing the bearing ball 12 of two layer structure as shown in FIG. 2, mixed powders for the internal layer portion 13 and for the surface layer portion 14 are prepared, respectively. Thereafter, it is preferable to apply rolling granulation to the mixed powders.

As to a particle diameter of raw material powder, zirconium oxide powder and stabilizer powder are preferable to have an average particle diameter approximately from 0.2 to 3 $\mu$m. The conductivity enhancer powder, as mentioned above, is preferable to have an average particle diameter of 2 $\mu$m or less, and furthermore being preferable to have such a particle diameter that after the sintering gives the maximum diameter of the agglomerated portion of 10 $\mu$m or less. It is preferable to use powder less in scattering of particle diameter as for instance one of which standard deviation is 1.5 $\mu$m or less. Furthermore, in order to maintain the sliding properties as the bearing ball, it is preferable to employ particle like powder, not whisker or fiber.

As to the manufacturing method, for instance a method for manufacturing silicon nitride bearing balls can be employed. That is, cold isostatic press (CIP) can be applied to form a molded body. In particular, it is preferable to apply the CIP process twice or more consecutively, thereby enabling to improve mechanical strength.

When manufacturing the bearing ball of two layer structure, after disposing the molded body constituting the internal layer portion on the mixed powder forming the surface layer portion, the rolling granulation can be preferably implemented. The rolling granulation is a method in which while rolling the molded body constituting the internal layer portion, the mixed powder constituting the surface layer portion is effected to stick to manufacture the molded body. Thereby, the molded body having the surface layer portion of uniform thickness can be obtained with reproducibility. Also by means of a method in which after spreading in a mold a prescribed amount of the mixed powder forming the surface layer portion, the molded body constituting the internal layer portion is put to press mold, the bearing ball of two layer structure can be manufactured. However, in such method, the thickness of the surface layer portion tends to fluctuate.

Next, to the molded body having the surface layer portion and the internal layer portion after the rolling granulation, the CIP is applied. It is preferable, as mentioned above, to apply the CIP twice or more consecutively. In the case of the CIP being applied even when the molded body constituting the internal layer portion is manufactured, it is essentially the same with the application of twice or more. To the molded body of two layer structure after the rolling granulation, the CIP can be applied twice or more consecutively. When applying the method where the CIP is applied twice or more, pore or the like can be suppressed from being formed in the molded body. Accordingly, by applying the CIP twice or more, the bearing ball excellent in characteristics can be obtained.

As to the sintering method, atmospheric sintering or pressure sintering alone can be applied. However, it is preferable to apply two stages sintering in which after the atmospheric sintering or pressure sintering, hot isostatic press (HIP) is applied. In particular, the pores formed during the sintering can be closed due to the HIP treatment. Accordingly, the sliding properties as the bearing ball can be improved and the conductivity enhancer present on the surface can be more solidly fixed. This is very effective in preventing the conductivity enhancer from detaching.

After undergoing the aforementioned sintering process, surface polishing is implemented to obtain surface roughness stipulated in JIS Standard for bearing balls. At that time, it is preferable to control the polishing process so that a prescribed surface roughness can be obtained and the maximum diameter of the agglomerated portion of the conductivity enhancer is to be 10 $\mu$m or less.

The wear resistant member for electronic equipment of the present invention is, as mentioned above, one that is used as the bearing ball or the like mounted on various kinds of electronic equipment. According to the bearing ball having the configuration of the present invention as mentioned above, even when the diameter of the ball is made 3 mm or less, furthermore 2 mm or less, the deficiency due to the static electricity can be excellently cancelled. In particular, the static electricity generated when rotating at a rotation speed of 5000 rpm or more can be excellently released from the bearing ball of a diameter of for instance 3 mm or less to the ball receiver or the like. According to the present invention, even when rotating furthermore at the rotation speed of 8000 rpm or more, similarly the deficiency due to the static electricity can be cancelled. Furthermore, even when the bearing ball of a diameter of 3 mm or less, furthermore 2 mm or less is rotated at the rotation speed of 5000 rpm or more, furthermore 8000 rpm or more, excellent wear resistance can be obtained.

Figure 4:
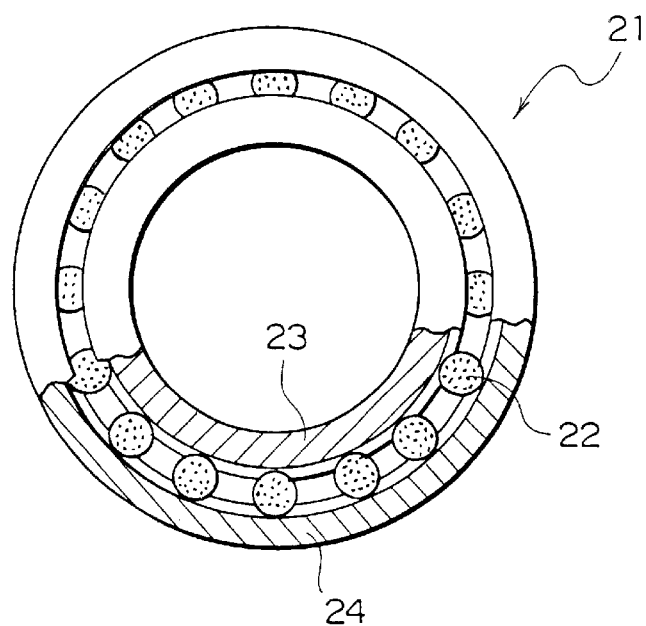
FIG. 4 is a diagram showing a configuration of one embodiment of a bearing ball of the present invention with a partial sectional view.

A bearing of the present invention comprises a rolling element, for instance a bearing ball, consisting of the wear resistant member for electronic equipment of the present invention as mentioned above. FIG. 4 is a diagram showing a configuration of one embodiment of the bearing of the present invention. The bearing 21 shown in FIG. 4 comprises a plurality of bearing balls 22 consisting of the wear resistant member for electronic equipment of the present invention, an inner ring 23 and an outer ring 24 supporting these bearing balls. The fundamental configuration is identical with an ordinary bearing.

In the aforementioned bearing 21, the inner ring 23 and outer ring 24 are preferably constituted of bearing steel such as SUSJ2 stipulated in JIS-G-4805, thereby reliable high speed rotation being obtained. As mentioned above, zirconium oxide is close in the linear expansion coefficient to the bearing steel. When rotating a motor apparatus at a high speed, due to the sliding thereof, the bearing balls 22 are heated. At that time, when the difference of the linear expansion coefficients between the bearing ball 22 and the ball receiver such as the inner ring 23 and outer ring 24 is too large, non-synchronized deflection due to thermal strain is generated to be difficult to realize reliable high speed rotation. As in the present invention, when the bearing ball 22 consisting of the zirconium oxide sintered body of which linear expansion coefficient is close to that of the bearing steel is used, an adverse influence due to the thermal strain can be suppressed.

The bearing ball 21 as mentioned above, in the electronic equipment such as magnetic recording devices such as HDDs and FDDs, optical disk devices such as CD-ROMs and DVDs, and various kinds of game machines, is used in a rotational driver of the various kinds of disks. Specifically, it is used in the rotational driver such as a spindle motor that rotates a disk like recording medium with a high speed.

Figure 5:
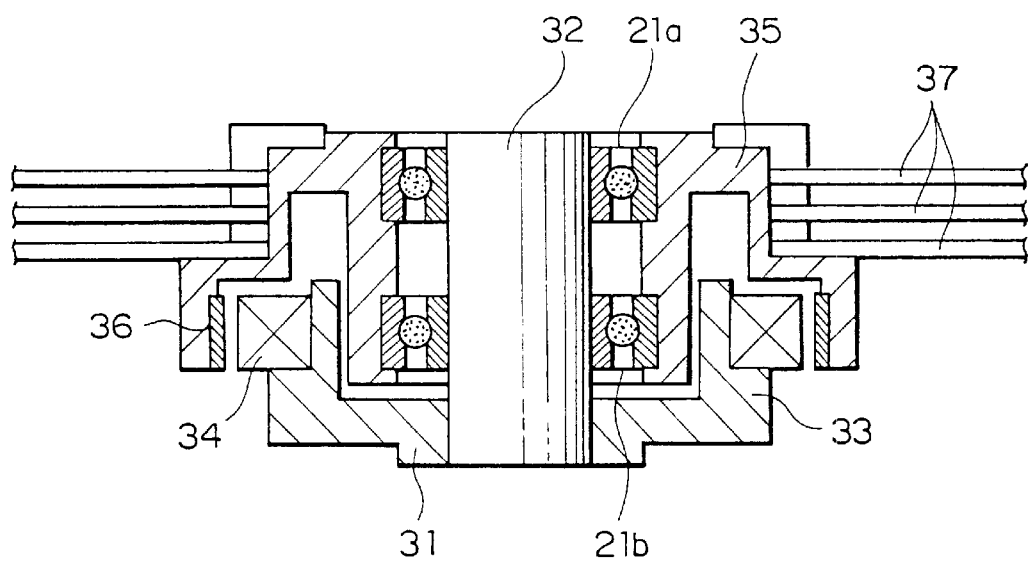
FIG. 5 is a sectional view showing a rough block diagram of one embodiment of a spindle motor of the present invention.

FIG. 5 is a diagram showing a configuration of a spindle motor according to one embodiment of the present invention. In a motor pedestal 31 a stator axis 32 is erected, thereto 32 a pair of upper and lower bearings 21a and 21b are mounted. The bearings 21a and 21b are configured as mentioned above. To the motor pedestal 31, a stator 33 is integrally fixed, the stator 33 having a coil 34.

To the stator axis 32, a hub 35 is attached rotatably through the bearings 21a and 21b. The hub 35 constitutes a rotor, a rotor magnet 36 being disposed at a position facing the coil 34 a prescribed distance apart. To the hub 35 a disk 37 that is rotated is mounted.

According to such spindle motor, based on the configuration of the bearings 21a and 21b, reliable high speed rotation can be realized. Furthermore, even rotating the disk 37 at a high speed, the static electricity generated due to the high speed rotation and affecting adversely on the electronic equipment such as the HDDs, through the inner ring 23, outer ring 24, and stator axis 32, can be released outside thereof. The spindle motor of the present invention can be preferably used in the electronic equipment such as magnetic recording devices such as HDDs and FDDs, optical disk devices such as CD-ROMs and DVDs, and various kinds of game machines.

Next, specific embodiments of the present invention and evaluation results thereof will be explained.

Embodiment 1 and Comparative Example 1

First, to zirconium oxide powder of an average particle diameter of 0.5 $\mu$m, as a stabilizer 3 mole percent of yttrium oxide powder of an average particle diameter of 1.5 $\mu$m is compounded, furthermore as a conductivity enhancer niobium carbide powder of an average particle diameter of 1.5 $\mu$m being compounded in various levels of addition. The levels of niobium carbide powder being compounded are as shown in Table 1. The respective raw material powders, after thoroughly mixing, are molded into a desired ball material shape by means of the CIP. Thereafter, the molded body undergoes atmospheric sintering in an inert gas atmosphere at temperatures from 1350 to 1680° C., followed by the HIP sintering at a temperature lower than that of the atmospheric sintering.

Thus, a plurality of zirconium oxide bearing balls are prepared. The diameter of the bearing ball is 2 mm, surface roughness thereof being set at grade 3. The maximum diameter of the agglomerated conductivity enhancer present on the surface of the bearing ball is 3 $\mu$m. Specific resistance and linear expansion coefficient of each of these bearing balls are measured. Results thereof are shown in Table 1. The specific resistance is measured according to the aforementioned method (cf. FIG. 6). For the measurement of the linear expansion coefficient, by means of the method identical with that for the bearing ball, square pole like specimens of 3×3×10 mm are prepared. These specimens are measured based on JIS-C-2141.

Furthermore, as Comparative Example 1 to the present invention, bearing balls such as shown in Table 1 are prepared, respectively. Sample 1 of the Comparative Example 1 is a zirconium oxide bearing ball prepared similarly with Embodiment 1 except for no conductivity enhancer being contained, sample 2 being a zirconium oxide bearing ball prepared similarly with Embodiment 1 except for a large amount of conductivity enhancer being contained. Sample 3 of Comparative Example 1 is a silicon nitride bearing ball.

Next, the respective bearing balls and ball receivers made of bearing steel SUJ2 are combined to prepare bearings, respectively. These bearings each are mounted on spindle motors to use as the motor for HDD. These spindle motors are rotated at a rotation speed of 8000 rpm continuously for 100 hours, the deficiency due to the static electricity and sliding properties (high speed rotatability) at that time being investigated.

The deficiency due to the static electricity is confirmed based on whether the HDD is damaged due to the static electricity in its ordinary operation or not. In the evaluation of the high speed rotatability, after continuous rotation for 100 hours at the rotation speed of 8000 rpm, a magnitude of sliding sound after 100 hours rotation is compared with that after 1 hour that is set at 100 to obtain a change rate of the sliding sound. The change rate of the sliding sound (percent) is obtained based on [{(the sliding sound after 100 hours–the sliding sound after 1 hour)/the sliding sound after 1 hour}× 100]. By measuring such change rate of the sliding sound, the deficiency such as non-synchronized deflection accompanying the thermal strain with a portion other than the bearing ball can be discerned.

TABLE 1

| Sample No. | Content of conductivity enhancer (volume %) | Specific resistance (Ω · m) | Linear expansion coefficient (×10⁻⁶/° C.) | Deficiency due to static electricity | Change rate of sliding sound (%) |
|---|---|---|---|---|---|
| E1 1 | 15 | 1 × 10⁴ | 10.2 | none | 3 |
| 2 | 17.5 | 2 × 10² | 9.8 | none | 3 |
| 3 | 20 | 7 × 10¹ | 9.7 | none | 5 |
| 4 | 25 | 1 | 9.7 | none | 6 |
| CE1 1 | 0 | ≧10⁸ | 11.0 | yes | 3 |
| 2 | 40 | ≦1 × 10⁻³ | 9.0 | none | 18 |
| 3 | 0 | ≧10⁸ | 4.0 | yes | 4 |

E1: Embodiment 1,
CE1: Comparative Example 1

As obvious from Table 1, it is found that the zirconium oxide bearing balls of the present invention show appropriate values of specific resistance and the linear expansion coefficients close to that of sample 1 of the Comparative Example 1 that does not contain the conductivity enhancer. In general, the linear expansion coefficient of the bearing steel is approximately 12×10⁻⁶/° C. Accordingly, the bearing ball of the present invention of which linear expansion coefficient is close to that of the bearing steel is particularly effective in the bearing of which bearing receiver or the like is made of bearing steel. It is found that based on these characteristics, the bearings using the respective bearing balls of Embodiment 1 are all excellent in high speed rotatability.

On the other hand, both sample Nos. 1 and 3 of Comparative Example 1 that do not contain the conductivity enhancer show such high insulation performance as specific resistance of 10⁸ Ω·m or more. Accordingly, in the bearings that use these bearing balls, when rotated at a high speed, the deficiency due to the static electricity is caused. Specifically, due to the deficiency due to the static electricity, the HDD cannot be started. Furthermore, it is found that in sample 2 of Comparative Example 1 in which a large amount of conductivity enhancer is added, the change rate of the sliding sound is large, being inferior in the high speed rotatability.

Embodiment 2

Except for altering the conductivity enhancer to materials shown in Table 2, similarly with sample 4 of Embodiment 1 (in which the conductivity enhancer is added by 20 volume percent), the respective zirconium oxide bearing balls are prepared. The specific resistance and linear expansion coefficient of each bearing ball are measured similarly with Embodiment 1. Furthermore, with these bearing balls each, similarly with Embodiment 1, the bearings and spindle motors are assembled. Similarly with Embodiment 1, the deficiency due to the static electricity and the sliding properties (high speed rotatability) of the respective spindle motors are investigated. These results are shown in Table 2.

TABLE 2

| Sample No. | Material of conductivity enhancer | Specific resistance (Ω · m) | Linear expansion coefficient (× 10⁻⁶/° C.) | Deficiency due to static electricity | Change rate of sliding sound (%) |
|---|---|---|---|---|---|
| E2 1 | NbC | 1.0 | 9.7 | none | 3 |
| 2 | TiC | 1.0 | 9.6 | none | 3 |
| 3 | WC | 1.3 | 9.9 | none | 4 |
| 4 | Mo₂C | 1.4 | 9.9 | none | 5 |
| 5 | TaC | 1.3 | 10.0 | none | 4 |
| 6 | Cr₃C₂ | 1.2 | 9.6 | none | 5 |
| 7 | HfC | 1.2 | 9.8 | none | 3 |
| 8 | ZrC | 1.1 | 9.9 | none | 4 |
| 9 | Mn₃C | 1.2 | 9.8 | none | 5 |
| 10 | SiC | 1.1 | 9.9 | none | 3 |

E2: Embodiment 2

As obvious from Table 2, it is confirmed that even when the material of the conductivity enhancer is changed, the zirconium oxide bearing balls all having the specific resistance stipulated by the present invention show excellent results.

Embodiment 3, Comparative Example 2

In the aforementioned Embodiment 1, niobium carbide as the conductivity enhancer is compounded by 20 weight percent in all samples to prepare a plurality of zirconium oxide bearing balls. In the preparation of these bearing balls, the average particle diameter or the like of the conductivity enhancer is altered to control the maximum agglomerate diameter of the conductivity enhancer present on the surface of the bearing ball. The maximum agglomerate diameters of the conductivity enhancer are as shown in Table 3. The diameter of the bearing balls is 2 mm, surface polishing grade being 3. The specific resistance is all 1 Ω·m.

With the aforementioned bearing balls each, similarly with Embodiment 1 the bearings and spindle motors are assembled, respectively. Similarly with Embodiment 1, the deficiency due to the static electricity and sliding properties (high speed rotatability) of the spindle motors each are investigated. These results are shown together in Table 3. In the table, samples 1 and 2 of Comparative Example 2 are the same with Comparative Example 1.

TABLE 3

| Sample No. | Maximum agglomerate diameter of conductivity enhancer on ball surface (μm) | Deficiency due to static electricity | Change rate of sliding sound (%) |
|---|---|---|---|
| E3 1 | (not existing on surface) | slightly | 3 |
| 2 | 0.3 | none | 5 |
| 3 | 0.8 | none | 3 |
| 4 | 1.5 | none | 5 |
| 5 | 3 | none | 5 |
| 6 | 5 | none | 8 |
| 7 | 10 | none | 10 |
| 8 | 15 | none | 16 |
| CE2 1 | — | yes | 2 |
| 2 | — | yes | 20 |

E3: Embodiment 3, CE2: Comparative Example 2

As obvious from Table 3, it is found that according to the bearing balls each of Embodiment 3 on which surface the conductivity enhancer is present, in all cases the deficiency due to the static electricity can be cancelled. In sample 1 of Embodiment 3, the conductivity enhancer is contained but not present on the surface of the ball. As a result, the HDD, though not completely disturbed due to the static electricity, is slightly adversely affected. Accordingly, comment is given as "slighty" adversely affected.

The sliding sounds also show excellent values of by and large 10 percent or less. This is because due to the closeness of the linear expansion coefficient of the bearing ball to that of the bearing steel SUJ2 forming the stator axis and the ball receiver, thermal strain generated when rotated at a high speed can be skillfully alleviated. Sample 8 in which the maximum agglomerate diameter of the conductivity enhancer present on the ball surface is 15 μm shows a slightly larger change rate of the sliding sound as 16%. This is considered that because of a larger size of the conductivity enhancer present on the bearing ball surface that is a sliding surface, an advantage that the intrinsic linear expansion coefficient of zirconium oxide is close to that of the bearing steel is not made the best use.

Embodiment 4, Comparative Example 3

First, niobium carbide powder of an average particle diameter of 1.8 μm or less (standard deviation is 1.5 μm or less) as the conductivity enhancer, yttrium oxide powder of an average particle diameter of 1.5 μm as the stabilizer and zirconium oxide powder of an average particle diameter of 0.7 μm are prepared. The raw material powders each are divided into three to mix. Three mixed powders each are furthermore mixed to prepare the respective mixed raw material powders. Thus, the raw material powders each are mixed step by step to prevent the conductivity enhancer powder from agglomerating.

With the aforementioned mixed raw material powders each, similarly with Embodiment 1, a plurality of zirconium oxide bearing balls are prepared. The diameter of each bearing ball is 3 mm and surface polishing grade is set at 3. The number of the conductivity enhancer in a straight distance 50 μm of these bearing balls each are measured. The number of the conductivity enhancer is measured of a square pole sample (3×3×10 mm) prepared similarly with each sample of Embodiment. Furthermore, the specific resistance and linear expansion coefficient of each bearing ball are measured similarly with Embodiment 1.

The number of the conductivity enhancer in a straight distance 50 μm in the zirconium oxide sintered body is obtained in the following manner. Four positions of two on a surface and two on a section of each sintered body are arbitrarily selected (arbitrary area corresponding to unit area 100×100 μm). On an enlargement photograph of each position, a line of a width 0.3 mm corresponding to a straight distance 50 μm is drawn. The number of the conductivity enhancer touching that line is measured, being averaged over four positions to obtain an averaged value. Here, a sample shape is conveniently taken in a square pole. By lapping, even the respective characteristics of for instance a spherical bearing ball can be similarly measured.

Next, with the aforementioned bearing balls each, similarly with Embodiment 1 the bearings and spindle motors are assembled, respectively. Similarly with Embodiment 1, the deficiency due to the static electricity and sliding properties (high speed rotatability) of the spindle motors each are investigated. These results are shown together in Table 4. In Comparative Example 3 in the table, sample 1 is one in which the number of the conductivity enhancer is diminished and sample 2 is one in which the number of the conductivity enhancer is increased.

TABLE 4

| Sample No. | Number of conductivity enhancer in straight distance 50 μm (pieces) | Specific resistance (Ω · m) | Linear expansion coefficient (×10⁻⁶/° C.) | Deficiency due to static electricity | Change rate of sliding sound (%) |
|---|---|---|---|---|---|
| E4 1 | 3 | $9 \times 10^4$ | 10.5 | none | 3 |
| 2 | 5 | $3 \times 10^3$ | 9.9 | none | 4 |
| 3 | 7 | $2 \times 10^1$ | 9.8 | none | 5 |
| 4 | 10 | 8 | 9.7 | none | 8 |
| 5 | 15 | 2 | 9.5 | none | 10 |
| CE3 1 | 1 | $5 \times 10^7$ | 10.9 | yes | 2 |
| 2 | 25 | $1 \times 10^{-5}$ | 8.8 | none | 20 |

E4: Embodiment 4,
CE3: Comparative Example 3

As obvious from Table 4, all of the zirconium oxide bearing balls due to Embodiment 4 show appropriate specific resistance and furthermore show excellent results when applied to the bearing. On the other hand, sample 1 of Comparative Example 3 in which the number of the conductivity enhancer is scarce is rather high in the specific resistance. Sample 2 in which the number of the conductivity enhancer is many, though low in the specific resistance itself, is insufficient in the linear expansion coefficient. As a result, the change rate of the sliding sound is large.

In the respective zirconium oxide bearing balls of Embodiment 4, the maximum agglomerate diameter of the conductivity enhancer is at most from 2.0 to 2.2 μm. This means that the added conductivity enhancer does not so much agglomerate, or agglomerates at most in two or three pieces. In measuring the maximum diameter, the above mentioned enlargement photographs (unit area: 100×100 μm) at four positions are used, the largest one among them being taken as the maximum diameter. Accordingly, even the maximum diameter of the conductivity enhancer is from 2.0 to 2.2 μm, all size of the conductivity enhancer is not necessarily in the aforementioned range.

Embodiment 5

With a plurality of mixed powders for surface layer portion prepared similarly with each sample of Embodiment 1 (containing the conductivity enhancer) and mixed powder for internal layer portion that does not contain the conductivity enhancer, in the following ways bearing balls of two layer structure are prepared, respectively.

That is, first, with the mixed powder for internal layer portion, a spherical molded body is prepared by means of the CIP. Next, on the mixed powder for surface layer portion, the spherical molded body for internal layer portion is placed, followed by rolling granulation to prepare a spherical molded body having a surface layer portion and an internal layer portion. The surface layer portion is formed in the range of one-third the radius from the surface. The spherical molded body is further treated by means of the CIP, thereafter undergoing the atmospheric sintering at a temperature of 1680° C., subsequently followed by HIP treatment at 1680° C. The bearing ball is shaped finally to be a diameter of 2 mm, being surface polished to be grade 3 in the surface roughness. In all bearing balls of Embodiment, the difference between the maximum and minimum thicknesses of the surface layer portion is 5 μm or less.

Next, the specific resistance and linear expansion coefficient of the bearing balls each are measured similarly as Embodiment 1. Furthermore, with these bearing balls, in the similar ways with Embodiment 1, bearings and spindle motors are assembled, respectively. Then, similarly with Embodiment 1, the deficiency due to the static electricity and sliding properties (high speed rotatability) of the respective spindle motors are investigated. These results are shown in Table 5.

TABLE 5

| Sample No. | Specific resistance of surface layer portion ($\Omega \cdot m$) | Linear expansion coefficient ($\times 10^{-6}/°C.$) | Deficiency due to static electricity | Change rate of sliding sound (%) |
|---|---|---|---|---|
| E5 1 | 1 | 9.5 | none | 5 |
| 2 | $2 \times 10^1$ | 9.7 | none | 5 |
| 3 | $3 \times 10^2$ | 9.9 | none | 3 |
| 4 | $9 \times 10^3$ | 10.7 | none | 3 |

E5: Embodiment 5

As obvious from Table 5, it is found that all of the respective bearing balls having the surface layer portion containing a prescribed conductivity enhancer show excellent results.

Embodiment 6

Except for altering the conductivity enhancer to materials shown in Table 6, similarly with sample 1 of Embodiment 5, zirconium oxide bearing balls are prepared. The specific resistance and linear expansion coefficient of the bearing balls each are measured similarly as Embodiment 1. Furthermore, with these bearing balls, in the similar ways with Embodiment 1, bearings and spindle motors are assembled, respectively. Then, similarly with Embodiment 1, the deficiency due to the static electricity and sliding properties (high speed rotatability) of the respective spindle motors are investigated. These results are shown in Table 6.

TABLE 6

| Sample No. | Matrial of conductivity enhancer | Specific resistance of layer portion ($\Omega \cdot m$) | Linear expansion coefficient ($\times 10^{-6}/°C.$) | Deficiency due to static electricity | Change rate of sliding sound (%) |
|---|---|---|---|---|---|
| E6 1 | TiC | 1 | 9.3 | none | 5 |
| 2 | SiC | 1 | 9.5 | none | 4 |
| 3 | WC | 1 | 9.3 | none | 5 |
| 4 | $Mo_2C$ | 1 | 9.4 | none | 5 |
| 5 | TaC | 1 | 9.3 | none | 5 |
| 6 | $Cr_3C_2$ | 1 | 9.6 | none | 5 |
| 7 | HfC | 1 | 9.3 | none | 5 |
| 8 | ZrC | 1 | 9.6 | none | 5 |
| 9 | $Mn_3C$ | 1 | 9.6 | none | 5 |
| 10 | $B_4C$ | 1 | 9.7 | none | 4 |

E6: Embodiment 6

As obvious from Table 6, it is confirmed that even when The material of the conductivity enhancer is changed, all of the zirconium oxide bearing balls having the surface layer portion that contains a prescribed amount of the conductivity enhancer show excellent results.

Embodiment 7

As shown in Table 7, with the similar material as sample 1 of Embodiment 5, the bearing balls each in which the thickness of the surface layer portion and the difference between the maximum and minimum thicknesses of the surface layer portion are altered are prepared, respectively. Therewith, the rolling life is confirmed. The diameter of each bearing ball is, similarly with Embodiment 5, 2 mm (radius of 1 mm), the surface roughness being set at grade 3.

Rolling life test, by means of a thrust rolling life tester, is implemented by rolling the bearing ball on a plane table made of SUJ2 steel(counterpart). The rolling life, with the rotation of 400 hours under the conditions of the maximum contact stress a ball of 5.9 GPa, a rotation number of 1200 rpm, and turbine oil bath lubrication as one time, shows repetition times until the surface bearing ball is peeled off. Measurements are shown in Table 7.

TABLE 7

| Sample No. | Formation position of surface layer portion containing conductivity enhancer (ratio with respect to radius) | Difference between the maximum and minimum thicknesses of surface layer portion ($\mu m$) | Rolling life (times) |
|---|---|---|---|
| E7 1 | 5 $\mu m$ from surface (1/200 the radius) | 5 | $6 \times 10^5$ |
| 2 | 10 $\mu m$ from surface (1/100 the radius) | 3 | $\geq 2 \times 10^7$ |
| 3 | 0.1 mm from surface (1/10 the radius) | 5 | $\geq 2 \times 10^7$ |
| 4 | 0.2 mm from surface (1/5 the radius) | 5 | $\geq 2 \times 10^7$ |
| 5 | 0.33 mm from surface (1/3 the radius) | 5 | $\geq 2 \times 10^7$ |
| 6 | 0.5 mm from surface (1/2 the radius) | 5 | $\geq 2 \times 10^7$ |
| 7 | 0.1 mm from surface (1/10 the radius) | 30 | $8 \times 10^6$ |
| 8 | 0.2 mm from surface (1/5 the radius) | 30 | $1 \times 10^7$ |

E7: Embodiment 7

As obvious from Table 7, the bearing ball in which the thickness of the surface layer portion containing the conductivity enhancer is 10 $\mu m$ or more from the surface with the radius as a reference and in the range of one third or less the radius, and the difference between the maximum and minimum thicknesses of the surface layer portion is 5 $\mu m$ or less shows excellent rolling life.

Even the one in which the surface layer portion is formed up to one half from the surface like sample 6 can obtain the similar rolling life. However, in this case, as mentioned above, the fracture toughness is a little poor. Accordingly, when applied in the field of high speed rotation like the spindle motor for electronic equipment, problems such as non-synchronized deflection or the like are likely to occur. Furthermore, an increase of the content of the conductivity enhancer leads to an increase of costs. In particular, in the small bearing ball of which diameter is 2 mm or less, an increase of costs causes large problems. On the other hand, sample 1 in which the thickness of the surface layer portion is less than 10 $\mu m$ is insufficient in the rolling life due to the thinness of the surface layer portion. This is because due to the thinness of the surface layer portion, in carrying out the rolling life test, the surface layer portion tends to peel off.

Furthermore, even in samples 7 and 8 in which the difference between the maximum and minimum thicknesses of the surface layer portion exceeds 5 $\mu m$, the rolling life can be obtained to a certain extent. However, when there is non-uniformity in the thickness of the surface layer portion, it is considered that stress subject in the use as the bearing ball cannot be uniformly supported by the entire ball, resulting in deterioration of the rolling life.

Embodiment 8, Comparative Example 4

Except for the use of the respective raw material mixtures having the compositions shown in Table 8, similarly with Embodiment 1, zirconium oxide bearing balls each are prepared. The specific resistance, linear expansion coefficient, three-point bending strength and fracture toughness of the bearing balls are measured. Measurements of these are shown in Table 9. Three point bending strength is measured based on JIS R-1601. The fracture toughness is measured by means of IF method based on JIS-R-1607. For measurements of the three point bending strength and fracture toughness, test samples prepared similarly with the bearing balls each are used.

Next, with the above mentioned bearing balls, similarly with Embodiment 1, the bearings and spindle motors are assembled, respectively. Similarly with Embodiment 1, the deficiency due to the static electricity and sliding characteristics (high speed rotatability) of the respective spindle motors are investigated. These results are shown in Table 9.

TABLE 8

| Sample No. | Stabilizer (mol %) (including sintered additive) | | Conductivity enhancer (mol %) | | | |
|---|---|---|---|---|---|---|
| | $Y_2O_3$ | MgO | TaC | TiC | SiC | Others |
| E8  1 | 3 | 1 | 15 | — | 6 | — |
|     2 | 3 | 1 | — | 15 | 6 | — |
|     3 | 3 | 1 | 12 | 8 | 5 | — |
|     4 | 2 | 2 | 12 | 8 | 5 | — |
|     5 | 5 | 0.5 | 12 | 8 | 5 | — |
|     6 | 3 | 1 | — | 15 | 7 | — |
|     7 | 3 | 1 | — | — | — | NbC:20 |
|     8 | 3 | 1 | — | — | — | WC:25 |
|     9 | 3 | 1 | — | — | — | TiN:23 |
|    10 | 3 | 1 | — | — | — | $Mn_3C$:25 |
|    11 | 3 | 0 | 12 | 8 | 5 | — |
|    12 | 0 | 8 | 12 | 8 | 5 | — |
|    13 | 0 | 12 | 12 | 8 | 5 | — |
| CE4 1 | 3 | 1 | — | — | — | — |
|     2 | 3 | 1 | 20 | 10 | — | — |
|     3 | 3 | 1 | 5 | 2 | 3 | — |
|     4 | 8 | 1 | 12 | 8 | 5 | — |

E8: Embodiment 8, CE4: Comparative Example 4

As obvious from Table 9, the zirconium oxide bearing balls each in which yttria and magnesia are concurrently used to prepare are excellent in both the three point bending strength and fracture toughness. It is confirmed that based on these characteristics, all of the zirconium oxide bearing balls shows excellent characteristics.

As obvious from the above embodiments, the zirconium oxide sintered body having an appropriate value of specific resistance and wear resistant member therewith can be preferably used as bearing member for electronic equipment such as HDDs, on the basis of the specific resistance of the zirconium oxide sintered body the deficiency due to the static electricity being facilitated to cancel. Furthermore, by specifying the content of the conductivity enhancer giving an appropriate specific resistance to the zirconium oxide sintered body, the conductivity enhancer on the surface of the bearing ball, and the maximum agglomerate diameter and the number per a unit distance of the conductivity enhancer, characteristics intrinsic to zirconium oxide can be made the best use. Accordingly, in the rotational driver of various electronic equipment, high speed rotation excellent in reliability can be realized.

What is claimed is:

1. A wear resistant member for electronic equipment, comprising:
a zirconium oxide sintered body of which specific resistance is in the range from 1 to $10^5$ Ω·m, the zirconium oxide sintered body containing at least one conductive enhancer selected from the group consisting of carbides and nitrides of 4A group elements, 5A group elements, 6A group elements, 7A group elements, silicon and boron.

2. The wear resistant member for electronic equipment as set forth in claim 1:
wherein the conductive enhancer has a specific resistance of $10^5$ Ω·m or less.

3. The wear resistant member for electronic equipment as set forth in claim 2:
wherein the conductivity enhancer is at least one selected from the group consisting of carbides of tantalum,

TABLE 9

| Sample No. | Specific resistance (Ω · m) | Linear expansion coefficient ($\times 10^{-6}$/° C.) | Three point bending strength (Mpa) | Fracture toughness ($MN/m^{3/2}$) | Deficiency due to static electricity | Change rate of sliding sound (%) |
|---|---|---|---|---|---|---|
| E8  1 | $5 \times 10^4$ | 9.5 | 1257 | 6.9 | none | 3 |
|     2 | $2 \times 10^3$ | 9.4 | 1283 | 6.8 | none | 4 |
|     3 | 7 | 9.0 | 1362 | 7.1 | none | 6 |
|     4 | 8 | 9.0 | 1215 | 7.3 | none | 8 |
|     5 | 4 | 9.5 | 1234 | 6.7 | none | 5 |
|     6 | $6 \times 10^1$ | 9.3 | 1356 | 6.6 | none | 6 |
|     7 | $9 \times 10^4$ | 9.4 | 1285 | 6.9 | none | 4 |
|     8 | $3 \times 10^4$ | 9.0 | 1238 | 7.0 | none | 5 |
|     9 | $4 \times 10^4$ | 9.2 | 1373 | 6.6 | none | 6 |
|    10 | $2 \times 10^4$ | 9.5 | 1241 | 6.8 | none | 4 |
|    11 | $9 \times 10^4$ | 9.7 | 1277 | 6.5 | none | 3 |
|    12 | $7 \times 10^4$ | 9.8 | 968 | 13.5 | none | 4 |
|    13 | $7 \times 10^4$ | 9.7 | 935 | 12.5 | none | 5 |
| CE4 1 | $\geq 10^8$ | 9.1 | 1313 | 6.8 | yes | 3 |
|     2 | $3 \times 10^{-4}$ | 9.3 | 750 | 6.2 | none | 16 |
|     3 | $\geq 10^8$ | 9.4 | 1150 | 5.9 | yes | 5 |
|     4 | $3 \times 10^2$ | 9.0 | 675 | 5.2 | none | 13 |

E8: Embodiment 8, CE4: Comparative Example 4 niobium, chromium, tungsten, molybdenum, titanium, zirconium, hafnium, manganese and silicon.

4. The wear resistant member for electronic equipment as set forth in claim 2:

wherein the conductivity enhancer has a particulate shape of which average particle diameter is 2 μm or less.

5. The wear resistant member for electronic equipment as set forth in claim 2:

wherein a maximum diameter of an agglomerated portion of the conductivity enhancer is 10 μm or less.

6. The wear resistant member for electronic equipment as set forth in claim 2:

wherein the number of the conductivity enhancer is an arbitrary straight distance of 50 μm in the zirconium oxide sintered body is in the range from 3 to 20 pieces.

7. The wear resistant member for electronic equipment as set forth in claim 1:

wherein the zirconium oxide sintered body comprises a surface layer portion of which specific resistance is lower than that of an internal layer portion.

8. The wear resistant member for electronic equipment as set forth in claim 2:

wherein the conductivity enhancer is present only in a surface layer portion of the zirconium oxide sintered body.

9. The wear resistant member for electronic equipment as set forth in claim 1:

wherein the zirconium oxide sintered body contains at least one stabilizer selected from the group consisting of rare earth compounds and alkaline earth compounds.

10. The wear resistant member for electronic equipment as set forth in claim 1:

wherein the zirconium oxide sintered body contains together from 2 to 5 mole percent of rare earth compound and from 0.5 to 3 mole percent of alkaline earth compound.

11. The wear resistant member for electronic equipment as set forth in claim 1:

wherein the wear resistant member is used in a magnetic recording device or an optical disk device.

12. The wear resistant member for electronic equipment as set forth in claim 1:

wherein the wear resistant member is used in a hard disk drive.

* * * * *

UNITED STATES PATENT AND TRADEMARK OFFICE
CERTIFICATE OF CORRECTION

PATENT NO. : 6,475,940 B2
DATED : November 5, 2002
INVENTOR(S) : Yukihiro Takenami et al.

It is certified that error appears in the above-identified patent and that said Letters Patent is hereby corrected as shown below:

Column 1,
Line 15, change "(HDDS)" to -- (HDDs) --.
Line 40, change "occur" to -- occurs --.

Column 2,
Line 33, change "This causes" to -- As a consequence, this --.
Line 34, change "to lower" to -- lowers --.

Column 3,
Line 17, change "of 4A" to -- of the 4A --.

Column 5,
Line 36, change "As such" to -- In --.
Line 37, change "magnetic" to -- such as magnetic --.

Column 6,
Line 6, change "1 and 2" to -- 1 and 2 --.

Column 7,
Line 18, change "when added too" to -- when the amount added is too --.
Line 48, change "in inability" to -- in an inability --.

Column 9,
Line 1, change "the number" to -- if the number --.
Line 3, change "followings" to -- following --.
Line 4, change "are considered" to -- is considered --.
Line 5, change "component" to -- components --.
Line 6, change "is" to -- form --.
Line 24, change "there are" to -- there is --.
Line 25, change "and one" to -- and there is one --.
Line 42, change "is" to -- is, --.

Column 10,
Line 36, change "$\mu$m." to -- $\mu$m, --.

Column 12,
Line 38, change "pore" to -- pores --.
Line 40, change "more" to -- more consequently, --.

UNITED STATES PATENT AND TRADEMARK OFFICE
CERTIFICATE OF CORRECTION

PATENT NO.    : 6,475,940 B2
DATED         : November 5, 2002
INVENTOR(S)   : Yukihiro Takenami et al.

It is certified that error appears in the above-identified patent and that said Letters Patent is hereby corrected as shown below:

Column 13,
Line 7, change "of" to -- is made --.
Line 8, change "furthermore" to -- or even futhermore --.
Line 9, change "furthermore" to -- or even furthermore --.

Column 15,
Line 61, change "Matrial" to -- Material --.

Column 16,
Line 5, change "Matrial" to -- Material --.

Column 17,
Line 25, change "three to" to -- three powders to --.
Line 25, change "Three" to -- These three --.
Line 31, change "With the aforementioned mixed raw material powders each," to -- With each of the aforementioned raw material powders mixed, --.
Line 35, change "The" to -- Each of the --.
Line 36, change "each are" to -- is --.

Column 19,
Line 37, change "Matrial" to -- Material --.
Line 53, change "The" to -- the --.
Line 55, change "contains" to -- contain --.

Signed and Sealed this

Second Day of March, 2004

JON W. DUDAS
*Acting Director of the United States Patent and Trademark Office*